Feb. 7, 1956 C. J. REBER, JR 2,733,574
REFRIGERATING SYSTEM
Filed Feb. 1, 1954
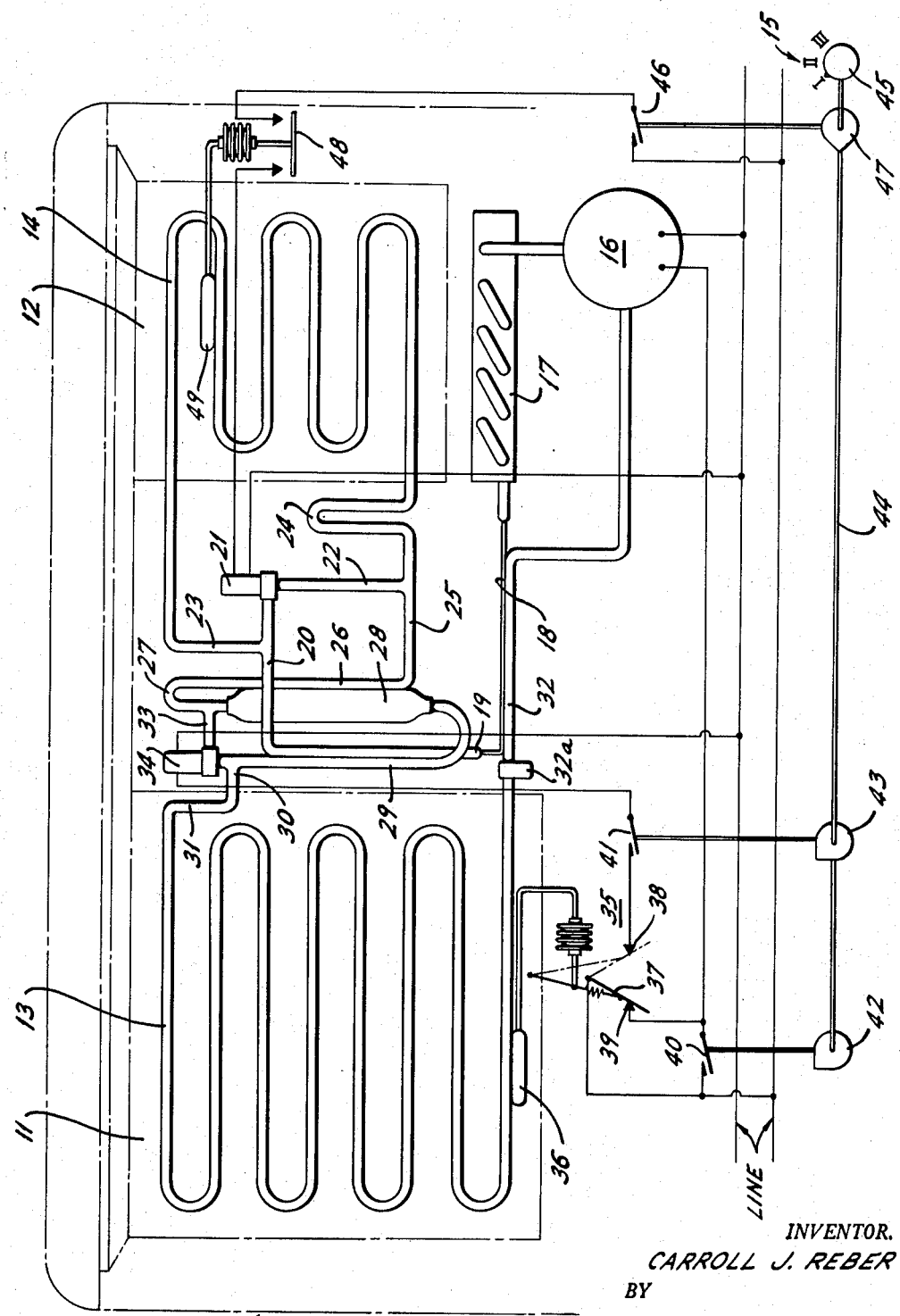
INVENTOR.
CARROLL J. REBER JR.
BY
Brown, Denk & Synnestvedt
AGENTS United States Patent Office 2,733,574
Patented Feb. 7, 1956

2,733,574

REFRIGERATING SYSTEM

Carroll J. Reber, Jr., Havertown, Pa., assignor to Philco Corporation, Philadelphia, Pa., a corporation of Pennsylvania Application February 1, 1954, Serial No. 407,510

9 Claims. (Cl. 62—3)

The invention hereinafter described and claimed relates to refrigerating systems of the plural compartment, plural temperature type. More particularly, the invention is concerned with controlled refrigeration of two compartment home freezers.

Home freezers are usually provided with one or more compartments, each of which is refrigerated to some predetermined temperature to meet a particular condition. For example, most single compartment freezers are designed to maintain temperatures suitable for the storage of frozen foods, frequently from −5 to +5° F. In freezers of the plural compartment type the compartments normally are maintained at substantially the same temperature, one however is usually more suited for the freezing of food stuffs. So far as applicant knows no freezer has been equipped with a system for maintaining one compartment at a substantially constant temperature suitable for the storage of frozen foods, while refrigerating another compartment selectively over a wide temperature range, say from −40° to +45° F., depending upon the needs of the user and without affecting the temperature of the other space or compartment.

A freezer with such flexibility has many advantages. By way of example, frozen foods may be stored in one compartment while the other compartment is being utilized either for quick-freezing foods at a temperature of −40° F., or for storing additional frozen foods at 0° F., or for keeping fresh foods and beverages at possibly 35 to 45° F. Another advantage of this type of freezer is that one compartment may be defrosted without disturbing the temperature of the other, thereby permitting frozen foods to be stored in one compartment while the other is being defrosted.

With the above in mind, it is the object of this invention to provide novel refrigerating apparatus of the plural compartment type, wherein at least one compartment may be refrigerated at a substantially constant temperature suitable for the storage of frozen foods, and another compartment may, selectively, be maintained at any desired value within a wide range of temperatures.

In achievement of the foregoing objectives, and first briefly described, my invention contemplates provision of a home freezer, preferably of the horizontal top-access type, provided with two compartments one of which is somewhat larger than the other. Novel refrigerating means is provided for maintaining a substantially constant freezing temperature in the larger compartment, and any of a wide range of temperatures, selectively, in the smaller compartment. This is accomplished by a novel refrigerating circuit coupled with a flow control system of such type that the evaporators of the two compartments may be connected in series flow circuit to maintain a substantially constant freezing temperature in both compartments, or said control system may be operated in such manner that most of the refrigerating effect is concentrated in one compartment to reduce its temperature substantially below that of the other compartment. Still further, the refrigerant may be substantially by-passed around the evaporator of the smaller compartment, thus to raise its temperature to above freezing. All of these results may be achieved by manipulation of a single control element having appropriate indicia indicating the various operating conditions which may be selected.

The manner in which the foregoing and other objects and advantages may best be achieved will be understood from a consideration of the following detailed description taken together with the accompanying drawing.

The single figure of the drawing is a diagrammatic view of a refrigerating system constructed in accordance with the present invention, the view also showing how the system may be associated with a two compartment home freezer, the latter being indicated in broken lines.

Now, making more detailed reference to the drawing, it is seen that the invention is therein illustrated diagrammatically as embodied in a refrigerator 10 of the top-access home freezer type. Included in the freezer are two insulated zones or compartments 11 and 12 adapted to be cooled by evaporator means including portions 13 and 14. Preferably, although not necessarily, the larger space 11 constitutes the main frozen food storage space which may normally be maintained at a temperature approximating 0° F., as more fully described hereinafter. The space 12 is adapted for use under at least three conditions as selected by the user. By manipulation of a single control element 15, between the three positions indicated, this compartment may be maintained selectively either at a sharp freezing temperature, ranging down to about −40° F., or at a temperature of about 0° F., or still further at temperatures of 35 to 45° F., it being understood, of course, that other temperatures may be selected, the foregoing values being used for the purposes of this description.

In addition to evaporators 13 and 14, the refrigerating system includes refrigerant circulating means comprising a compressor 16 and a condenser 17 from which liquid refrigerant flows toward the evaporators through expansion means of known type, such as the capillary tube restrictor shown at 18.

From restrictor 18, liquid refrigerant flows through a first conduit including vertical and horizontal portions 19 and 20, and from which it may, depending upon the condition of the flow means (solenoid operated valve 21) take either of two paths, through evaporator 14 or through by-pass conduit 22. Considering the valve to be closed, refrigerant flows upwardly through evaporator inlet 23 and then through evaporator 14. From the evaporator refrigerant flows through a second conduit including trap 24, and horizontal and vertical portions 25 and 26. At the top of vertical portion 26, the refrigerant reverses its flow through a short vertically arranged conduit section 27 passing downwardly into an accumulator 28. From the accumulator the refrigerant flows into evaporator 13 through a third conduit including vertical portion 29, and short horizontal and vertical portions 30 and 31. From evaporator 13 the spent refrigerant returns to the compressor by way of the suction conduit 32, a portion of which is in heat exchange relation with capillary tube 18 as is conventional practice. If desired, an accumulator 32a may be provided at the outlet of the evaporator to prevent excess liquid refrigerant from flowing to the compressor.

Under certain conditions of operation, to be more fully described hereinafter, it is necessary to prevent liquid refrigerant from entering evaporator 13. By-pass conduit 33 is provided for this purpose. Flow through conduit 33 is controlled by a second flow control means, such as solenoid operated valve 34.

Conduit 27 is arranged in a vertical position so that substantially all liquid refrigerant passing through it will flow into the accumulator regardless of the condition of valve 34. With the valve open, however, pressures within the accumulator and conduit 29 are substantially equalized thus trapping the liquid refrigerant in the accumulator and conduit.

It should be understood that all of the connecting conduits are of substantially the same restriction.

When valves 21 and 34 are closed and compressor 16 is operating, liquid refrigerant is supplied to both evaporators 13 and 14 in series as described above to maintain a freezing temperature of about 0° in both compartments. Cycling of the refrigerant circulating means under these conditions is controlled by temperature responsive means, such as switch 35, having associated therewith a feeler bulb 36 so disposed as to render switch 35 responsive to the temperature at evaporator 13.

The switch is of conventional design wherein the temperature range to which it is responsive may be adjusted.

For illustrative purposes, it can be considered as being set to respond to a temperature of −5° F. to move its contact arm 37 against one contact 38, and to a temperature of +5° F. to move the arm against the second contact 39.

It is to be understood that feeler bulb 36 may be placed in direct heat exchange relation with evaporator 13 or it may be disposed in the compartment 11 somewhat spaced from the evaporator, depending upon the requirements of the particular system. Either of these locations of feeler bulb 36 is contemplated by description of the switch 35 as being responsive to the temperature "at" the evaporator.

From the above description it is now evident that with valves 21 and 34 closed, evaporators 13 and 14 are connected in series and, with compressor 16 cycling under the control of temperature responsive switch 35, compartments 11 and 12 will be maintained substantially at 0° F. This condition is obtained when control element 15 is at the position identified as I on its dial.

When it is desired to reduce the temperature of compartment 12 substantially below 0° F., say to −40° F. for sharp freezing, while still maintaining the temperature of compartment 11 substantially at 0° F., control 15 is moved to position II on its dial thereby closing switches 40 and 41 in the control circuit as by cams 42 and 43 on shaft 44 attached to knob 45 on the control. Closing switch 40 places compressor 16 directly across the line so that it operates continuously, while closing of switch 41 places the solenoid of valve 34 across the line and under the control of temperature responsive switch 35, the purpose of which will be more fully described below.

With the controls so conditioned, liquid refrigerant is constantly supplied to evaporator 14—valve 21 being closed—from which it passes through trap 24, conduits 25, 26 and 27, and into accumulator 28. If evaporator 13 is not demanding refrigerant, arm 37 of switch 35 will be against contact 38 as shown in broken lines, thus opening valve 34. Liquir refrigerant, under this condition, passes into accumulator 28 and standpipe 29 where it is accumulated or trapped, while the flash gun from the refrigerant passes through conduit 33 and into evaporator 13, by-passing the accumulator and conduit standpipe 29. When the temperature at evaporator 13 rises sufficiently, arm 37 moves over against contact 39, closing valve 34, so that the liquid refrigerant in trap 28 and standpipe 29 flows into evaporator 13. This flow continues until the temperature at evaporator 13 is reduced to the desired degree at which time switch arm 37 again moves over against contact 38 reopening passage 33 to cut off the supply of liquid refrigerant to the evaporator.

It will now be understood that under these controlled conditions liquid refrigerant is constantly supplied to evaporator 14 reducing its temperature to far below 0 degrees so that compartment 12 may be used for sharp freezing and that simultaneously evaporator 13 maintains compartment 11 substantially at 0° F.

In order to prevent the bubbling of liquid refrigerant from accumulator 28 and standpipe 29 into evaporator 13 when valve 34 is open, and due to heat leakage through the cabinet walls, and the insulation in which these elements are positioned, they have been placed in heat exchange relation with refrigerant conduits 26 and 19, respectively.

Under another condition of operation when it is desired to use compartment 12 for the storage of fresh foods at temperatures ranging, for example, from 35 to 45° F., knob 45 of control 15 is moved to position III, opening switches 40 and 41 and closing switch 46, as by cam 47. Switch 46 is included in a circuit which controls the operation of solenoid valve 21, and which circuit further includes heat responsive means, such as switch 48, having associated therewith a feeler bulb 49 so disposed as to render the valve responsive to the temperature at evaporator 14. As with switch 35, it is to be understood that bulb 49 may be associated in direct heat exchange relation with evaporator 14, or it may be disposed in the compartment somewhat spaced from the evaporator, depending upon the requirements of the particular system. Either of these locations of feeler bulb 49 is contemplated by description of switch 46 as being responsive to temperatures "at" the evaporator 14.

With the control circuit conditioned as just described, compressor 16 is again cycled under control of the temperature responsive switch 35. During every "on" cycle of compressor 16, refrigerant is circulated through evaporator 13, it being understood that conduit 33 is closed by valve 34. Opening and closing of valve 21 in accordance with the temperature, as sensed by bulb 49, causes liquid refrigerant to flow either through evaporator 14, when the valve is closed, or to by-pass the evaporator and flow through valve 21 and conduit 22 directly into conduit 25. Thus with switch 48 disposed to close at say 35° F., the selected lower cycling limit, valve 21 will open to by-pass liquid refrigerant around evaporator 14. When the temperature at the evaporator rises to the upper cycling limit, say 45° F., switch 48 causes the valve to close and liquid refrigerant will again flow through conduit 22 into evaporator 14.

Refrigerant trap 24 has been provided to prevent refrigerant flowing reversely into evaporator 14 when valve 21 is open (condition III).

Thus it is seen that under control setting III, low temperatures may be maintained in the large compartment 11 while above freezing temperatures may be maintained in the smaller compartment 12. It is also to be understood that evaporator 14 may be defrosted after having been used for freezing purposes by moving knob to position III.

From the foregoing description, it will now be recognized that by the present invention there is provided a novel system for refrigerating a multi-compartment refrigerator, in which one compartment is maintained at a substantially constant low temperature and another compartment is refrigerated selectively to temperatures ranging from substantially below to temperatures substantially above the values maintained in the said one compartment.

I claim:

1. A refrigeration system comprising: refrigerant circulating and condensing means; expansion means; evaporator means including first and second evaporator portions; accumulator means including a liquid collecting portion, a gas collecting portion, an inlet port, and an outlet port, the latter being in the said liquid collecting portion; conduit means connecting all of said previously mentioned means in closed refrigerant flow circuit, said conduit means including a first portion connecting said condensing and expansion means to the inlet of said first portion of said evaporator means, a second portion connecting the outlet of said first evaporator portion to the inlet of said accumulator means, a third portion connecting the outlet of said accumulator means to the inlet of said second evaporator portion, and a fourth portion for returning the refrigerant from the outlet of second evaporator portion to said circulating means; a by-pass conduit connecting said gas collecting portion of said accumulator means to said third conduit portion; and flow control means for controlling the flow of refrigerant through said by-pass conduit; said by-pass conduit being so associated with said accumulator and said third conduit that said flow control means may cause liquid refrigerant to flow into said second evaporator portion or be trapped in said accumulator means.

2. A refrigeration system comprising: refrigerant circulating and condensing means; expansion means; evaporator means including first and second evaporator portions; accumulator means; conduit means connecting all of said previously mentioned means in closed refrigerant flow circuit, said conduit means including a first portion connecting said condensing and expansion means to the inlet of said first portion of said evaporator means, a second portion connecting the outlet of said first evaporator portion to the inlet of said accumulator means, a third portion connecting the outlet of said accumulator means to the inlet of said second evaporator portion, and a fourth portion for returning the refrigerant from the outlet of second evaporator portion to said circulating means; a first by-pass conduit connecting said first and second conduit portions; a first flow control means for controlling the flow of refrigerant through said first by-pass conduit; a second by-pass conduit connecting said second conduit portion to said third conduit portion; and a second flow control means for controlling the flow of refrigerant through said second by-pass portion, said first by-pass conduit being so associated with said first and second conduit portions that said first flow control means may cause refrigerant to flow into or to by-pass said first evaporator portion; said second by-pass conduit being so associated with said second and third conduits that said second flow control means may cause liquid refrigerant to flow into said second evaporator portion or be trapped in said accumulator means.

3. A system in accordance with claim 2, and further including a refrigerant trap in said second conduit portion between the connection of said first by-pass conduit therewith and said first evaporator portion, said trap preventing reverse flow of refrigerant through said first evaporator portion when flow through said first by-pass conduit is established.

4. A system in accordance with claim 2, wherein said first conduit portion is in heat exchange relation with said third conduit portion.

5. A system in accordance with claim 2, and further including control means responsive to the temperature of said second evaporator portion to control operation of said circulating means, said system also including first switch means for rendering said last mentioned control means ineffective and said circulating means continuously operative, and second switch means for placing said second flow control means under the control of said temperature responsive control means whereby said second flow control means is rendered responsive to the temperature at said second evaporator portion.

6. A refrigeration system in accordance with claim 2, wherein said first conduit includes a horizontally positioned portion and the inlet of said first evaporator portion is connected to said horizontally positioned portion at an upwardly presented part of the latter, whereby liquid refrigerant flows past said inlet when flow is established through said first by-pass conduit.

7. A system in accordance with claim 2, wherein said second by-pass conduit connects to a substantially vertical portion of said second conduit in such a manner that liquid refrigerant flows past said second by-pass conduit regardless of the condition of said second flow control means.

8. A system in accordance with claim 4, wherein said second conduit portion is in heat exchange relation with said accumulator means.

9. A refrigeration system comprising: refrigerant circulating means; expansion means; evaporator means including first and second evaporator portions; accumulator means; conduit means connecting all of said previously mentioned means in closed refrigerant flow circuit so that flow is normally from said expansion means through said first evaporator portion, from said first evaporator portion to said accumulator means, from said accumulator means to said second evaporator means and thence returning to said circulating means; means for substantially preventing flow of liquid refrigerant to said second evaporator portion under a modified condition of operation, said last means comprising a by-pass conduit interconnecting an upper gas-collecting portion of said accumulator means and the inlet of said second evaporator portion, said conduit being closed during the said normal flow of refrigerant and through which, under said modified condition of operation, pressures existing in said accumulator means and in said second evaporator portion may be substantially equalized to cause at least a major portion of the liquid refrigerant circulating within the system to be trapped in said accumulator means; and means for establishing communication through said last-mentioned conduit.

References Cited in the file of this patent

UNITED STATES PATENTS

| | | |
|---|---|---|
| 2,084,424 | Bauman | June 22, 1937 |
| 2,133,948 | Buchanan | Oct. 25, 1938 |
| 2,133,964 | Buchanan | Oct. 25, 1938 |
| 2,667,757 | Shoemaker | Feb. 2, 1954 |